United States Patent
Jiang et al.

(10) Patent No.: US 10,823,448 B2
(45) Date of Patent: Nov. 3, 2020

(54) HEAT EXCHANGE SYSTEM, AIR CONDITIONING CONTROL SYSTEM, AND AIR CONDITIONING SYSTEM CONTROL METHOD

(71) Applicant: Hangzhou Sanhua Research Institute Co., Ltd., Hangzhou, Zhejiang (CN)

(72) Inventors: Xiaojun Jiang, Zhejiang (CN); Likun Yang, Zhejiang (CN); Yingchong Lu, Zhejiang (CN); Rongrong Zhang, Zhejiang (CN)

(73) Assignee: Hangzhou Sanhua Research Institute Co., Ltd., Hangzhou, Zhejiang (CN)

( * ) Notice: Subject to any disclaimer, the term of this patent is extended or adjusted under 35 U.S.C. 154(b) by 74 days.

(21) Appl. No.: 15/736,703

(22) PCT Filed: May 17, 2017

(86) PCT No.: PCT/CN2017/084687
§ 371 (c)(1),
(2) Date: Dec. 14, 2017

(87) PCT Pub. No.: WO2017/162218
PCT Pub. Date: Sep. 28, 2017

(65) Prior Publication Data
US 2018/0195754 A1  Jul. 12, 2018

(30) Foreign Application Priority Data

Mar. 23, 2016 (CN) .......................... 2016 1 0169988
Apr. 11, 2017 (CN) .......................... 2017 1 0234924

(51) Int. Cl.
*F24F 11/84* (2018.01)
*F25B 5/02* (2006.01)
(Continued)

(52) U.S. Cl.
CPC .............. *F24F 11/84* (2018.01); *F24F 11/37* (2018.01); *F24F 11/46* (2018.01); *F24F 11/49* (2018.01);
(Continued)

(58) Field of Classification Search
CPC .......... F25B 2600/2513; F25B 2600/25; F25B 49/02; F24F 11/84; F24F 11/46
See application file for complete search history.

(56) References Cited

U.S. PATENT DOCUMENTS 9,261,300 B2    2/2016 Golden et al.
2011/0232311 A1  9/2011 Korenaga et al.
(Continued)

FOREIGN PATENT DOCUMENTS

CN    103568775 A    2/2014
CN    103776131 A    5/2014
(Continued)

OTHER PUBLICATIONS

International Search Report for International Application No. PCT/CN2017/084687, dated Aug. 25, 2017.
(Continued)

*Primary Examiner* — Marc E Norman
*Assistant Examiner* — Schyler S Sanks
(74) *Attorney, Agent, or Firm* — Wolf, Greenfield & Sacks, P.C.

(57) ABSTRACT

A heat exchange system, an air conditioning control system, and an air conditioning system control method. A control portion of the heat exchange system respectively adjusts the opening of electronic expansion valves, and controls the electronic expansion valves to store an initialisation state and position information before powering down so that the electronic expansion valves first perform initialisation state switching when next powering up, thereby reducing the risk
(Continued)

of the electronic expansion valves being out of step, and saving system start-up time.

14 Claims, 12 Drawing Sheets

(51) Int. Cl.
    *F24F 11/37*     (2018.01)
    *F24F 11/46*     (2018.01)
    *F24F 11/49*     (2018.01)
    *F25B 41/06*     (2006.01)
    *F25B 49/02*     (2006.01)
    *F25B 40/00*     (2006.01)

(52) U.S. Cl.
    CPC .............. *F25B 5/02* (2013.01); *F25B 41/062* (2013.01); *F25B 49/02* (2013.01); *F25B 40/00* (2013.01); *F25B 2341/065* (2013.01); *F25B 2341/0653* (2013.01); *F25B 2600/2513* (2013.01); *Y02B 30/72* (2013.01)

(56) References Cited

U.S. PATENT DOCUMENTS

2015/0362236 A1* 12/2015 Jiang ..................... F25B 41/062
                                                            137/12
2017/0106725 A1     4/2017   Kim et al.

FOREIGN PATENT DOCUMENTS

| | | |
|---|---|---|
| CN | 104515252 A | 4/2015 |
| EP | 2 952 835 A1 | 12/2015 |
| JP | H03-067964 A | 7/1991 |
| JP | H08-145439 A | 6/1996 |
| JP | 2009-109149 A | 5/2009 |
| JP | 2010-043861 A | 2/2010 |
| JP | 2011-144951 A | 7/2011 |
| JP | 2011-196649 A | 10/2011 |
| JP | 2012-127606 A | 7/2012 |
| JP | 2014-163532 A | 9/2014 |
| KR | 2015-0142671 A | 12/2015 |
| KR | 10-1703604 B1 | 2/2017 |
| WO | WO 2013/109535 A1 | 7/2013 |
| WO | WO-2014117721 A1 * | 8/2014 ............ F16K 31/04 |
| WO | WO 2015/043519 A1 | 4/2015 |

OTHER PUBLICATIONS

Written Opinion for International Application No. PCT/CN2017/084687, dated Aug. 25, 2017.
Office Action for Japanese Application No. 2018-504128, dated Feb. 5, 2019.
Office Action for Korean Application No. 10-2017-7037425, dated Apr. 18, 2019.
Extended European Search Report and European Application No. 17769495.7, dated Nov. 27, 2019.
Office Action for Japanese Application No. 2018-504128, dated Aug. 11, 2020.

* cited by examiner

Power down phase of the EXV

Power down phase of the EXV

Power down phase of the EXV

HEAT EXCHANGE SYSTEM, AIR CONDITIONING CONTROL SYSTEM, AND AIR CONDITIONING SYSTEM CONTROL METHOD

The application is a National Stage application of PCT international patent application PCT/CN2017/084687, filed on May 17, 2017 which claims priority to Chinese Patent Application No. 201710234924.1, titled "HEAT EXCHANGE SYSTEM, AIR CONDITIONER CONTROL SYSTEM AND METHOD FOR CONTROLLING AIR CONDITIONER SYSTEM", filed with the Chinese State Intellectual Property Office on Apr. 11, 2017, and Chinese Patent Application No. 201610169988.3, titled "AIR CONDITIONER SYSTEM, CONTROL SYSTEM AND CONTROL METHOD THEREFOR", filed with the Chinese State Intellectual Property Office on Mar. 23, 2016, all of which applications are incorporated herein by reference in their entireties.

FIELD

The present disclosure relates to the technical field of an air conditioner system, and in particular to a heat exchange system, an air conditioner control system and a method for controlling an air conditioner system.

BACKGROUND

In a conventional vehicle system, a vehicle air conditioner is one of main energy consumption units. With improving of an energy saving requirement of a whole vehicle, energy saving of the vehicle air conditioner gradually attracts attention. In the vehicle air conditioner system, a refrigerant flow of the system is controlled effectively, such that the system achieves an optimum performance, thereby being beneficial to save energy by the air conditioner system. For example, in an air conditioner system of an electric vehicle, a compressor may be adopted to adjust with a variable speed, a working condition range is wide, and an opening can be accurately adjusted by an electronic expansion valve, to meet a requirement of a flow change of the compressor. However, as an execution component, the electronic expansion valve of the air conditioner system needs to accurately adjust the opening under control of reasonable control logic, such that a heat exchange system of the air conditioner has an optimized performance and operates reliably. If opening adjustment of the electronic expansion valve is out of step, it may result in that adjustment of the air conditioner system is out of control. Presently, based on a whole operation process of the vehicle air conditioner system, a control process of the electronic expansion valve generally includes the following phases: starting, operation control and shut-down and so on. Adjustment performance during the operation control phase directly influences energy consumption adjustment of the air conditioner, therefore how to improve the opening adjustment performance of the electronic expansion valve is a technical development trend in the field of the air conditioner system presently.

SUMMARY

In order to solve the above technical problems, a heat exchange system, an air conditioner control system and a method for controlling an air conditioner system which can reduce a risk of an electronic expansion valve being out of step and save starting time of a system are provided according to the present disclosure.

In order to achieve the above object, a technical solution of an air conditioner system is provided according to the present disclosure as follows. A heat exchange system is provided, which includes: a compressor; a first heat exchanger; at least one evaporator; and at least one electronic expansion valve, where the first heat exchanger is arranged in a pipeline between an outlet of the compressor and an inlet of the electronic expansion valve, an outlet of the evaporator and an inlet of the compressor are communicated by a pipeline, and a control unit of the heat exchange system is configured to control an opening of the electronic expansion valve; and the control unit of the heat exchange system is configured to store initialization state information of the electronic expansion valve, the initialization state information including at least an initialization completed state, and the electronic expansion valve switches an initialization state to the initialization completed state based on the initialization state information, then the opening of the electronic expansion valve is adjusted; and/or the control unit of the heat exchange system is configured to, based on position information of the electronic expansion valve stored by the control unit, use the position information of the electronic expansion valve as initial position information of the electronic expansion valve, and the electronic expansion valve is adjusted to be in the initialization completed state based on the initial position information, then the opening of the electronic expansion valve is adjusted.

Optionally, the at least one evaporator includes a first evaporator and a second evaporator, and the at least one electronic expansion valve includes a first electronic expansion valve and a second electronic expansion valve;

the heat exchange system further includes a second heat exchanger, the second heat exchanger includes a first heat exchange portion and a second heat exchange portion, and the first heat exchange portion and the second heat exchange portion are configured to exchange heat with each other;

the first heat exchange portion is arranged in a pipeline between an outlet of the first heat exchanger and at least one of an inlet of the first electronic expansion valve and an inlet of the second electronic expansion valve, and the second heat exchange portion is arranged in a pipeline between the inlet of the compressor and at least one of an outlet of the first evaporator and an outlet of the second evaporator; and in the heat exchange system, the first evaporator and the second evaporator are arranged in parallel, the first electronic expansion valve and the first evaporator are arranged in series, and the second electronic expansion valve and the second evaporator are arranged in series.

Another technical solution of an air conditioner system is provided according to the present disclosure as follows. A heat exchange system is provided, which includes a compressor, a first heat exchanger, a second heat exchanger, a first evaporator, a second evaporator, a first electronic expansion valve and a second electronic expansion valve, where the first heat exchanger is arranged in a pipeline between an outlet of the compressor and inlets of the first electronic expansion valve and the second electronic expansion valve; the second heat exchanger includes a first heat exchange portion and a second heat exchange portion, the first heat exchange portion and the second heat exchange portion are capable of exchanging heat with each other; the first heat exchange portion of the second heat exchanger is arranged in a pipeline between an outlet of the first heat exchanger and inlets of the first electronic expansion valve and the second electronic expansion valve, the second heat exchange portion of the second heat exchanger is arranged in a pipeline between an inlet of the compressor and outlets of the first evaporator and the second evaporator; the first evaporator and the second evaporator are arranged in parallel, the first electronic expansion valve and the first evaporator are arranged in series, the second electronic expansion valve and the second evaporator are arranged in series;

the air conditioner system can adjust openings of the first electronic expansion valve and the second electronic expansion valve; after being powered up and before adjusting the openings, the first electronic expansion valve and the second electronic expansion valve complete initialization switching based on initialization state information and original position information stored by the air conditioner system; the first electronic expansion valve and the second electronic expansion valve can adjust their states to an initialization completed state, and the first electronic expansion valve and the second electronic expansion valve can acquire corresponding initial position information.

In any one of the above heat exchange systems, optionally, the control unit of the heat exchange system includes:
an air conditioner controller; and
an electric control unit of the electronic expansion valve, configured to control a mechanical portion of the electronic expansion valve to operate, where
the air conditioner controller or the electric control unit includes an initialization state switching subunit configured to:
identify or extract at least the initialization state information of the electronic expansion valve, and the electronic expansion valve switches the initialization state to the initialization completed state based on the initialization state information; and/or
use the position information of the electronic expansion valve as the initial position information of the electronic expansion valve, and the electronic expansion valve is adjusted to be in the initialization completed state based on the initial position information.

Optionally, the heat exchange system is a heating and ventilating air conditioner cooling system, the heat exchange system further includes a third electronic expansion valve and a cooler; the third electronic expansion valve and the cooler are arranged between the outlet of the first heat exchanger and the inlet of the compressor, and the cooler is arranged in parallel with the first evaporator and the second evaporator.

Optionally, the heat exchange system further includes a third electronic expansion valve and a cooler, the third electronic expansion valve and the cooler are arranged between the outlet of the first heat exchanger and the inlet of the compressor, and the cooler is arranged in parallel with the first evaporator and the second evaporator;

the third electronic expansion valve and the cooler are arranged in series; a refrigerant flow of a branch where a battery cooler is located is controlled by adjusting an opening of the third electronic expansion valve; the cooler is a cooling element for a heat generation component configured to decrease a temperature of the heat generation component;

the third electronic expansion valve switches an initialization state to the initialization completed state based on initialization state information of the third electronic expansion valve stored by the control unit of the heat exchange system, then the opening of the third electronic expansion valve is adjusted; and/or an initialization state switching subunit of the control unit uses, based on position information of the third electronic expansion valve stored by the control unit of the heat exchange system, the position information of the third electronic expansion valve as initial position information of the electronic expansion valve, and the electronic expansion valve is adjusted to be in the initialization completed state based on the initial position information, then the opening of the third electronic expansion valve is adjusted.

An air conditioner control system is further provided according to the present disclosure, which includes an air conditioner controller; and an electric control unit for controlling an operation of an electronic expansion valve, where the air conditioner controller is an air conditioner control center and is configured to receive and analyze at least one of a control signal and input information of a vehicle system or a control panel, and transmit the analyzed control signal to the electronic expansion valve, and the electronic expansion valve operates based on the control signal; or the electric control unit is configured to receive and analyze at least one of control information and sensor information transmitted by the air conditioner controller, obtain a control signal by calculating based on at least one of a preset control program for the electronic expansion valve stored by the electric control unit and feedback information stored by the electric control unit, convert the control signal into an electric quantity which is capable of being implemented by the electronic expansion valve, and control the electronic expansion valve by the electric quantity; and the air conditioner controller includes a storing unit configured to store initialization state information of the electronic expansion valve, the initialization state information including at least an initialization completed state; or the electric control unit includes a storing unit configured to store initialization state information of the electronic expansion valve; and the electronic expansion valve switches an initialization state to the initialization completed state based on the initialization state information of the electronic expansion valve provided by the storing unit.

Optionally, the storing unit is further configured to store position information of the electronic expansion valve; and an initialization switching signal is obtained based on the position information and the initialization state information provided by the storing unit, and the electric control unit controls the electronic expansion valve to complete switching of the initialization state based on the initialization switching signal.

Optionally, the air conditioner controller or the electric control unit includes an initialization state switching subunit configure to:
identify or extract at least initialization state information of the electronic expansion valve and control the electronic expansion valve to switch the initialization state to the initialization completed state; and use, based on position information of the electronic expansion valve stored by the storing unit, the stored position information of the electronic expansion valve as initial position information of the electronic expansion valve, and the electronic expansion valve acquires the initial position information and is adjusted to be in the initialization completed state based on the initial position information, then an opening of the electronic expansion valve is adjusted.

Optionally, the storing unit is arranged in a central processing module of the air conditioner controller or the electric control unit, the storing unit is a non-volatile storing element;

when the air conditioner controller starts a program for controlling the electronic expansion valve to be powered down, the storing unit of the air conditioner controller or the electric control unit is configured to store at least position information and the initialization state information of the electronic expansion valve for being identified by an initialization state switching subunit;

when the air conditioner controller starts a program for controlling the electronic expansion valve to be powered up, the initialization state switching subunit is configured to: identify or extract, based on the information stored by the storing unit, at least the initialization state information of the electronic expansion valve; control the electronic expansion valve to switch the initialization state to the initialization completed state; and use the position information of the electronic expansion valve stored by the storing unit as initial position information, and the electronic expansion valve is adjusted to be in the initialization completed state based on the initial position information.

Optionally, initialization state switching signal includes the initialization state information and position information, the air conditioner controller provides the initialization state switching signal to the electric control unit in a local internet network control mode, and the electric control unit is configured to receive the initialization state switching signal and switch a state of the electronic expansion valve to the initialization completed state, receive the stored position information and set the position information as initial position information of the electronic expansion valve; or the electric control unit is configure to read the initialization completed state in the stored initialization state information, switch a state of the electronic expansion valve to the initialization completed state, read stored position information and set the position information as initial position information of the electronic expansion valve; or the air conditioner controller is configure to read the initialization completed state in the stored initialization state information and stored position information, and provide the initialization completed state and the position information to the electric control unit to switch a state of the electronic expansion valve to the initialization state and set the stored position information as initial position information of the electronic expansion valve.

Optionally, an initialization state switching signal provided to the electronic expansion valve by the air conditioner controller is an LIN signal, the initialization state switching signal includes at least two LIN data bytes, each of the two LIN data bytes includes eight data bits;

stored position information is indicated by all eight bits of an N-th byte and two low bits (bit 0 and bit 1) of an (N+1)-th byte; the initialization state information is indicated by two high bits (bit 6 and bit 7) of the (N+1)-th byte, where N is equal to or greater than 1; and the air conditioner controller is configured to transmit initialization state switching and the stored position information to the electric control unit of the electronic expansion valve by the initialization state switching signal.

Optionally, the air conditioner controller is configured to receive at least one of input information and sensor information of a master control board of an air conditioner system; the electric control unit is configured to receive and analyze at least one of control information and sensor information transmitted by the air conditioner controller, obtain a control signal by calculating based on at least one of a preset control program for the electronic expansion valve stored by the electric control unit and feedback information stored by the electric control unit, convert the control signal into an electric quantity which is capable of being implemented by the electronic expansion valve, and control the electronic expansion valve by the electric quantity; the air conditioner controller stores position information and initialization state information of the electronic expansion valve by providing the storing unit and transmits the stored information to the electric control unit; the control signal includes at least an initialization state switching signal; or the electric control unit stores the feedback information by providing a storing unit, the feedback information includes at least the initialization state information and the position information stored by the storing unit of the electric control unit, for being read by the electric control unit; or the air conditioner controller is configured to receive at least one of input information and sensor information of a master control board of an air conditioner system, obtain a control signal by calculating based on at least one of a preset control program for the electronic expansion valve stored by the air conditioner controller and feedback information stored by the air conditioner controller, and transmit the control signal to the electric control unit; the electric control unit is configured to convert the control signal into an electric quantity which is capable of being implemented by the electronic expansion valve and control the electronic expansion valve by the electric quantity; and the feedback information stored by the air conditioner controller includes at least the initialization state information and position information.

Optionally, the air conditioner controller is provided with a central processing module; the electric control unit of the electronic expansion valve is provided with an LIN transceiving module, a central processing module, a drive control module and a drive module; a bus transceiving module is configured to transmit a signal detected on an LIN bus to the central processing module; the central processing module is configured to receive and analyze control information from a master control board of an air conditioner system, transmit an analyzed control signal for the electronic expansion valve to the drive control module, record or store current position information of the electronic expansion valve, and transmit a feedback signal corresponding to an analyzing result to the LIN bus via the bus transceiving module; the storing unit is arranged in the central processing module of the electric control unit in an integration manner, the control signal includes an initialization state switching signal, or the storing unit is arranged in the central processing module of the air conditioner controller; or the air conditioner controller is provided with a central processing module, the electric control unit is provided with a drive control module and a drive module; the central processing module of the air conditioner controller is configured to receive at least one of input information and sensor information, generate a control signal for the electronic expansion valve by calculating, transmit the control signal to the drive control module, and record or store current position information of the electronic expansion valve; the storing unit of the air conditioner controller is arranged in the central processing module of the air conditioner controller in an integration manner; and a stepping drive control module is configured to receive the control signal for controlling the electronic expansion valve which is transmitted by the central processing module of the air conditioner controller or the electric control unit and transmit the control signal to the drive module; and the drive module is configured to provide an electric signal meeting a requirement of the control signal to an electronic coil, and a valve needle is controlled to operate by applying the electric signal on the electronic coil.

Optionally, the air conditioner control system may be configured to control an air conditioner system including the heat exchange system.

A method for controlling an air conditioner system is further provided according to the present disclosure, which includes a method for controlling an electronic expansion valve of the air conditioner system, where the method for controlling the electronic expansion valve includes: when an air conditioner controller starts a program for controlling the electronic expansion valve to be powered down, storing, by a built-in storing unit of the air conditioner controller or an electric control unit, initialization completed state and position information of the electronic expansion valve; and controlling the electronic expansion valve to be powered down after the initialization completed state and the position information of the electronic expansion valve is stored, where the electronic expansion valve completes switching of an initialization state at a power up phase based on stored initialization state information and the position information of the electronic expansion valve.

Optionally, the method further includes: when the air conditioner controller starts a program for controlling the electronic expansion valve to be powered up, obtaining, by a built-in initialization state switching subunit of the air conditioner controller or the electric control unit, an initialization state switching signal by calculating based on the initialization state information and the position information of the electronic expansion valve stored by the storing unit, controlling the electronic expansion valve to switch a state of the electronic expansion valve to an initialization completed state, and setting the stored position information as a current initial position, where switching of the initialization state is completed.

Optionally, when the air conditioner controller starts a program for controlling the electronic expansion valve to be powered up, the method includes:

controlling, by the air conditioner controller, the electronic expansion valve to be powered up;

transmitting, by the air conditioner controller, an initialization state switching signal and the stored position information to the electronic expansion valve in a local internet network control mode; identifying or extracting, by an initialization state switching subunit, at least the initialization state information and the position information of the electronic expansion valve based on the information stored by the storing unit, and providing an initialization state switching signal to the electronic expansion valve; switching a state, by the electric control unit of the electronic expansion valve, based on the received initialization state switching signal; and receiving, by the electric control unit of the electronic expansion valve, the stored position information, and setting the position information stored by the storing unit as a current initial position, where switching of the initialization state of the electronic expansion valve is completed; or reading, by the initialization state switching subunit, the initialization completed state in the initialization state information from the storing unit of the electric control unit, where a state of the electronic expansion valve is the initialization completed state; and reading, by the electric control unit, the position information and setting the position information as a current initial position of the electronic expansion valve, where switching of the initialization state of the electronic expansion valve is completed; or reading, by the initialization state switching subunit, the initialization completed state in the initialization state information, from the storing unit of the air conditioner controller, where a state of the electronic expansion valve is the initialization completed state; and reading, by the air conditioner controller, a position, and setting the read position as a current initial position, where switching of the initialization state of the electronic expansion valve is completed.

Optionally, when the air conditioner controller starts a program for controlling the electronic expansion valve to be powered down, the method includes:

communicating, by the air conditioner controller, with the electronic expansion valve in a local internet network control mode; storing, by the storing unit of the air conditioner controller, position information and initialization state information of the electronic expansion valve; and controlling the electronic expansion valve to be powered down normally; or controlling, by the air conditioner controller, the storing unit of the electronic expansion valve to store the position information and the initialization state information of the electronic expansion valve by transmitting a storing instruction in a local internet network control mode; and transmitting, by the electronic expansion valve, a storing completion feedback signal to the air conditioner controller after the electronic expansion valve stores the information; and controlling the electronic expansion valve to be powered down normally; or storing, by the storing unit of the air conditioner controller, the position information and the initialization state information of the electronic expansion valve; and controlling the electronic expansion valve to be powered down normally.

Optionally, when the air conditioner controller starts a program for controlling the electronic expansion valve to be powered down, the method includes:

transmitting, by the air conditioner controller or the electric control unit, an initialization control signal to the electronic expansion valve to control the electronic expansion valve to perform initialization; and after the initialization is completed, controlling the storing unit of the air conditioner controller or the storing unit of the electric control unit to store state information and position information fed back by the electronic expansion valve.

Optionally, the air conditioner system includes the heat exchange system.

As compared with the conventional technology, according to the present disclosure, initialization state information and position information are stored before the electronic expansion valve is powered down, such that the electronic expansion valve can quickly switch to the initialization completed state after being powered up again, thereby reducing a risk of the electronic expansion valve being out of step and saving starting time of the system.

DETAILED DESCRIPTION OF EMBODIMENTS

Figure 1:
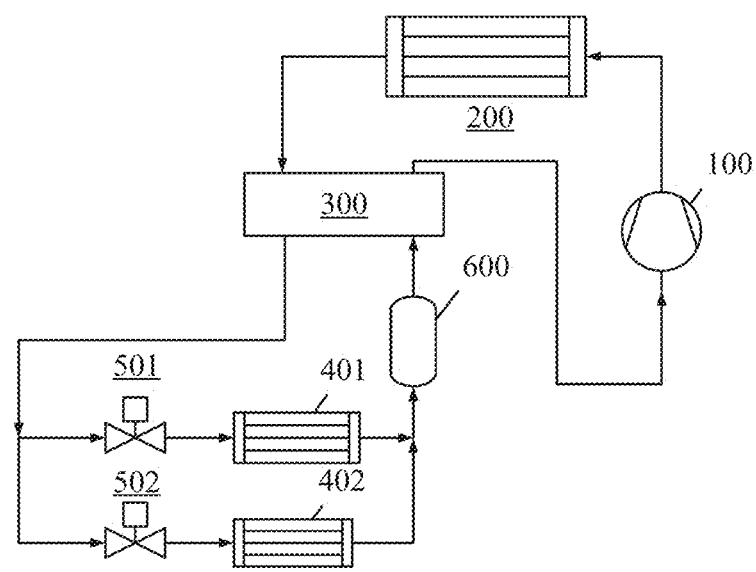
FIG. 1 is a schematic diagram of a part of an air conditioner system according to an embodiment of the present disclosure.
Figure 2:
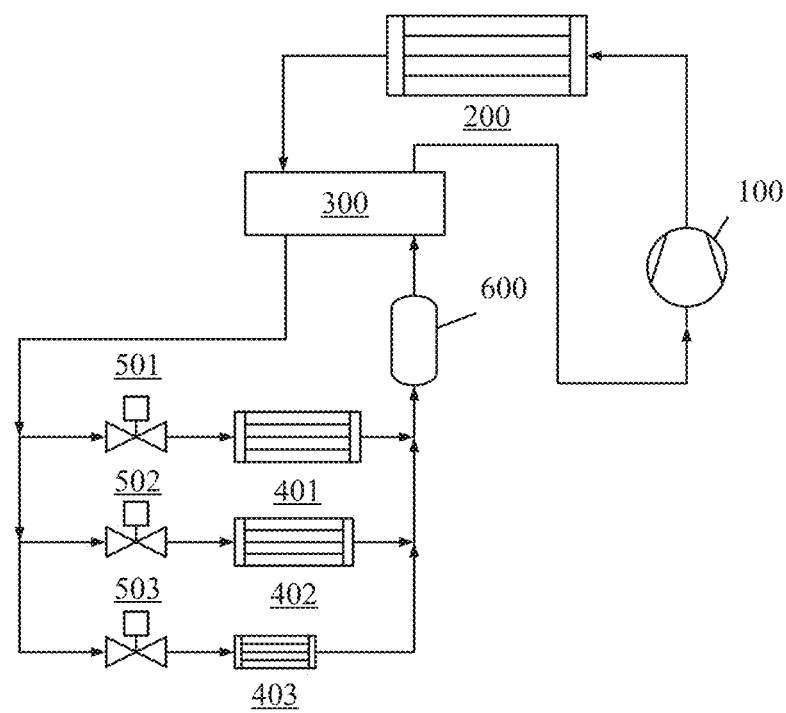
FIG. 2 is a schematic diagram of a system of an air conditioner system according to another embodiment of the present disclosure.

Referring to FIG. 1 and FIG. 2, an air conditioner system is disclosed according to an embodiment. The air conditioner system includes at least a heat exchange system, such as a vehicle or household air conditioner system. The heat exchange system exchanges heat with air at an environment side or cooling liquid by a system refrigerant. The heat exchange system has a cooling function and/or a heating function and/or a dehumidification function. The air conditioner system may perform refrigeration cycle or heating cycle under a control instruction. The air conditioner system forms a refrigerant flow path by a compressor 100, an outdoor heat exchanger, an indoor heat exchanger and at least one electronic expansion valve (EXV) which are connected together. The air conditioner system performs refrigeration cycle when the indoor heat exchanger functions as an evaporator, and performs heating cycle when the indoor heat exchanger functions as a condenser. For example, refrigeration cycle is performed in the hot summer such that it is cool in the vehicle or indoor, and heating cycle is performed in the cold winter such that it is warm in the vehicle or indoor. Humidity of environmental air in the vehicle or indoor may be adjusted, such that there is no mist in the vehicle and an air humidity indoor is relatively suitable. The electronic expansion valve is a throttling element for adjusting a refrigerant flow between an external heat exchanger and an internal exchanger during the refrigerant/heating cycle. The heat exchange system includes a compressor, a first heat exchanger, at least one evaporator and at least one electronic expansion valve. The first heat exchanger is arranged in a pipeline between an outlet of the compressor and an inlet of the electronic expansion valve, and an outlet of the evaporator and an inlet of the compressor are communicated by a pipeline. A control unit of the heat exchange system can control an opening of the electronic expansion valve, and the control unit stores initialization state information. The initialization state information includes at least an initialization completed state. The control unit of the heat exchange system can store initialization state information of the electronic expansion valve, the initialization state information includes at least the initialization completed state, the electronic expansion valve switches an initialization state to the initialization completed state based on the initialization state information, then the opening of the electronic expansion valve is adjusted; and/or the control unit uses, based on position information of the electronic expansion valve stored by the control unit of the heat exchange system, the position information of the electronic expansion valve as initial position information of the electronic expansion valve, and thus the electronic expansion valve can be adjusted to be in the initialization completed state based on the initial position information, then the opening of the electronic expansion valve is adjusted. The initialization state information and the position information are stored before the electronic expansion valve is powered down, such that the electronic expansion valve can quickly acquire current position information and can quickly switch to the initialization completed state after being powered up again, thereby reducing a risk of the electronic expansion valve being out of step, saving system staring time of the system and reducing energy consumption of the system.

The control unit of the heat exchange system includes an air conditioner controller and an electric control unit of the electronic expansion valve. The electric control unit can control a mechanical portion of the electronic expansion valve to operate. The air conditioner controller or the electric control unit includes an initialization state switching subunit which can identify or extract at least initialization state information of the electronic expansion valve, the electronic expansion valve switches an initialization state based on the initialization state information to the initialization completed state. And/or the initialization state switching subunit uses the position information of the electronic expansion valve as initial position information of the electronic expansion valve, and thus the electronic expansion valve can be adjusted to be in the initialization completed state based on the initial position information.

In the embodiment shown in FIG. 1, the heat exchange system includes a compressor 100, a first heat exchanger 200, a second heat exchanger 300, a first evaporator 401, a second evaporator 402, a first electronic expansion valve 501 and a second electronic expansion valve 502 connected by a refrigerant pipeline. The first heat exchanger 200 is arranged between an outlet of the compressor 100 and inlets of the first electronic expansion valve 501 and the second electronic expansion valve 502. The second heat exchanger 300 includes a first heat exchange portion 301 and a second heat exchange portion 302, and the first heat exchange portion 301 and the second heat exchange portion 302 can exchange heat with each other. The second heat exchanger 300 is a double-channel heat exchanger. Working mediums of a channel of the first heat exchange portion 301 and a channel of the second exchange portion 302 contact with each other by a manner of heat transfer without mass transfer. The first heat exchange portion 301 of the second heat exchanger 300 is arranged in a pipeline between an outlet of the first heat exchanger 200 and inlets of the first electronic expansion valve 501 and the electronic expansion valve 502, and the second heat exchange portion 302 of the second heat exchanger 300 is arranged in a pipeline between an inlet of the compressor 100 and outlets of the first evaporator 401 and the second evaporator 402. A liquid storage device 600 is arranged in a pipeline between an inlet of the second heat exchanger 300 and outlets of the evaporators, to prevent liquid strike to the compressor from the refrigerant. Two branches are arranged in parallel between the outlet of the second heat exchanger 300 and the inlet of the compressor in the heat exchange system, one of the two branches includes the first electronic expansion valve 501 and the first evaporator 401, and the other branch includes the second electronic expansion valve 502 and the second evaporator 402. The first evaporator 401 is arranged between the outlet of the first electronic expansion valve 501 and the inlet of the compressor 100. The second evaporator 402 is arranged between the outlet of the second electronic expansion valve 502 and the inlet of the compressor 100. The first evaporator 401 and the second evaporator 402 are arranged in parallel, the first electronic expansion valve 501 and the first evaporator 401 are arranged in series, and the second electronic expansion valve 502 and the second evaporator 402 are arranged in series. The first electronic expansion valve 501 and the second electronic expansion valve 502 can effectively control refrigerant flows of branches where the first evaporator 401 and the second evaporator 402 are located respectively by adjusting openings according to specific conditions, thereby reducing mutual interference between the branches.

In another embodiment shown in FIG. 2, in the heat exchange system, another branch is arranged in parallel between the outlet of the second heat exchanger 300 and the inlet of the compressor 100, and the branch includes a third electronic expansion valve and a cooler. The cooler may function as a battery cooling element to decrease a temperature of a battery device generating heat. The third electronic expansion valve and the cooler are arranged in series. The third electronic expansion valve controls a refrigerant flow in a branch where a battery cooler is located by adjusting an opening. It should be noted that, for description of control systems and control methods of the first electronic expansion valve, the second electronic expansion valve and the third electronic expansion valve, the first electronic expansion valve, the second electronic expansion valve and the third electronic expansion valve may be collectively referred to as electronic expansion valves (EXV).

The first heat exchanger 200, as a heat absorbing device or a heat diffusion device, such as an evaporator or a condenser, may absorb heat from an external environment medium or diffuse heat to the external environment medium by the refrigerant. The second heat exchanger 300, as a heat absorbing device, such as an evaporator, absorbs heat from the external environment medium by the refrigerant. The third heat exchanger 400, as a heat diffusion device, such as a condenser or an air cooling device, diffuses heat to the environmental medium by the refrigerant.

Figure 3A:
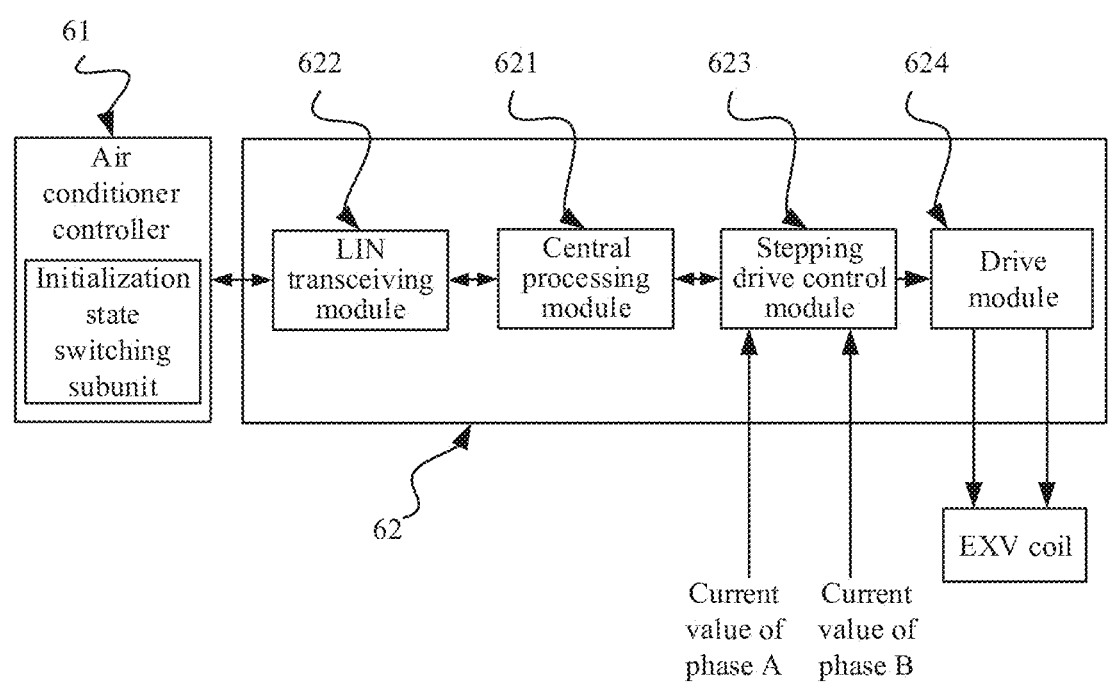
FIG. 3a shows an electric control unit of an air conditioner system according to an embodiment of the present disclosure.
Figure 3B:
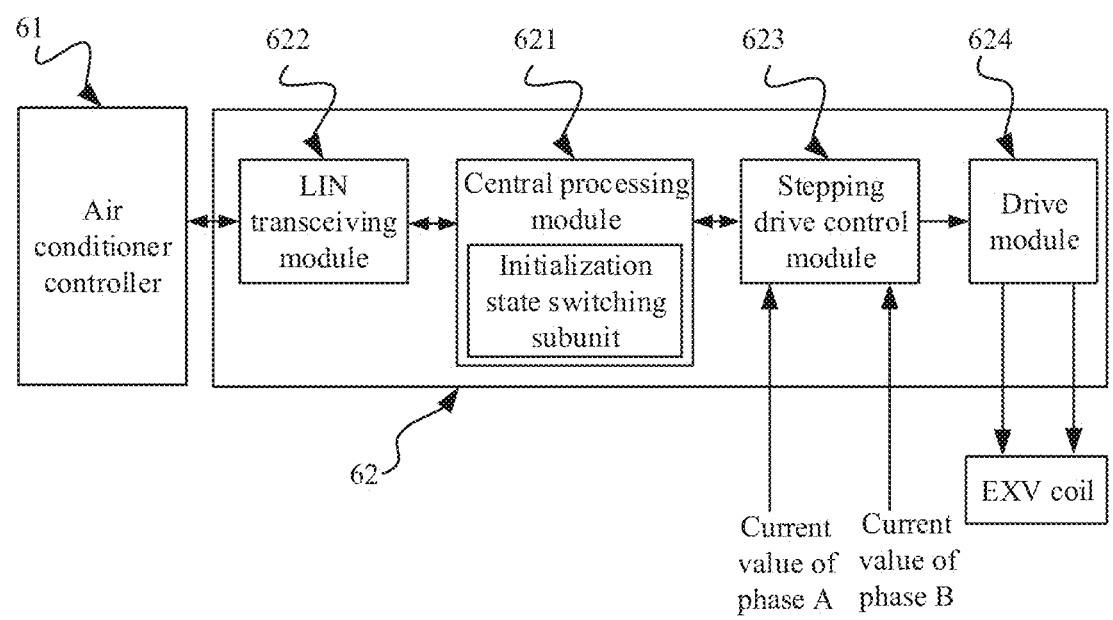
FIG. 3b shows an electric control unit of an air conditioner system according to another embodiment of the present disclosure.
Figure 4:
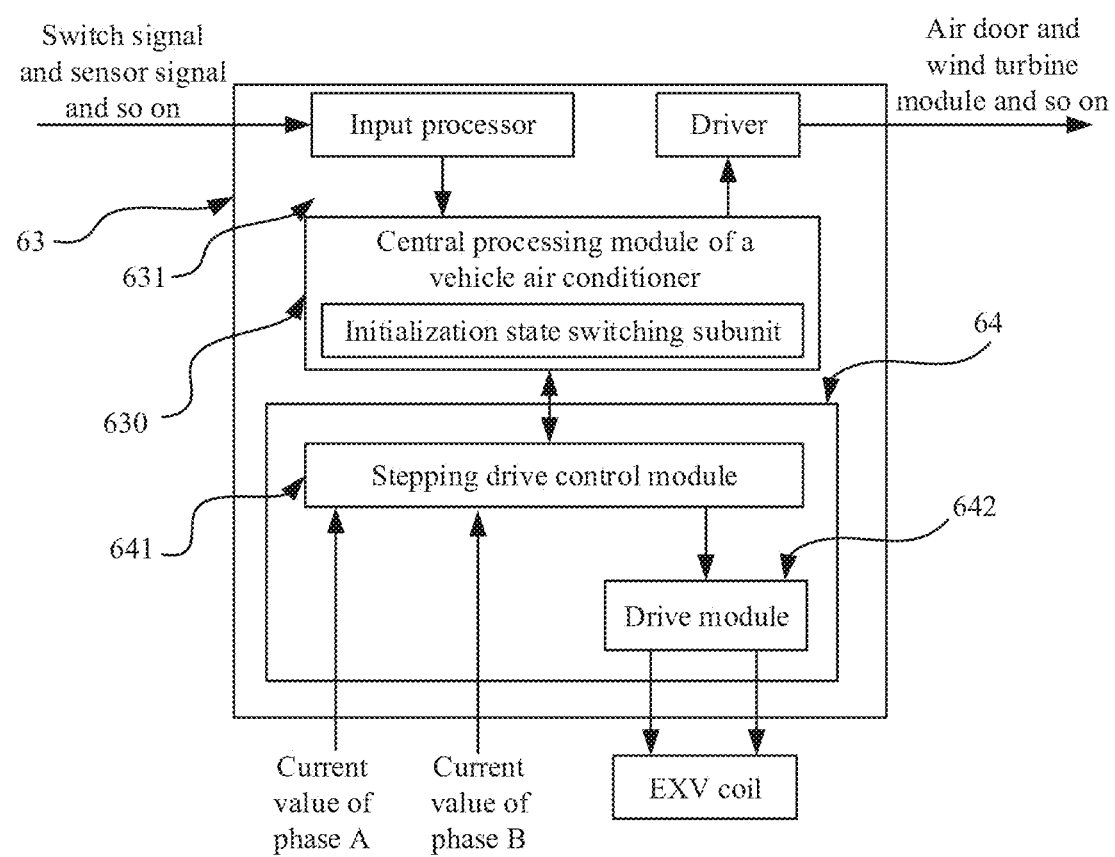
FIG. 4 shows an electric control unit of an air conditioner system according to another embodiment of the present disclosure.

FIG. 3a, FIG. 3b and FIG. 4 schematically show three embodiments of a control system included in the air conditioner system. The air conditioner control system includes an air conditioner controller 61 and an electric control unit 62 for controlling an operation of the electronic expansion valve. The air conditioner controller 61 is configured to receive and analyze a control signal and/or input information of a vehicle system or a control panel, and transmit the analyzed control signal to the electronic expansion valve, the electronic expansion valve operates based on the control signal. Alternatively, the electric control unit 62 is configured to receive and analyze control information and/or sensor information transmitted by the air conditioner controller 61, obtain a control signal by calculating based on preset control programs for the electronic expansion valve stored by the electric control unit 62 and/or feedback information stored by the electric control unit, convert the control signal into an electric quantity which can be implemented by the electronic expansion valve, and control the electronic expansion valve by the electric quantity. The air conditioner controller 61 includes a storing unit which can store initialization state information of the electronic expansion valve, and the initialization state information includes at least an initialization completed state. Alternatively, the electric control unit includes a storing unit which can store initialization state information of the electronic expansion valve. The electronic expansion valve switches an initialization state to the initialization completed state based on the initialization state information of the electronic expansion valve provided by the storing unit.

The air conditioner controller 61 or the electric control unit 62 includes an initialization state switching subunit which can identify or extract at least initialization state information of the electronic expansion valve and control the electronic expansion valve to switch the initialization state to the initialization completed state. The storing unit can store position information of the electronic expansion valve. Before an opening of the electronic expansion valve is adjusted, the initialization state switching subunit, based on the stored position information of the electronic expansion valve, uses the stored position information of the electronic expansion valve as initial position information of the electronic expansion valve, such that the electronic expansion valve can acquire the initial position information and can be adjusted to be in an initialization completed state based on the initial position information, and the electronic expansion valve can quickly acquire current position information and can quickly switch to the initialization completed state after being powered up again, thereby reducing a risk of the electronic expansion valve being out of step, saving starting time of the system and reducing energy consumption of the system.

As shown in FIG. 3a and FIG. 3b, the air conditioner controller 61, as a control center of an air conditioner system, is configured to receive and analyze a control signal and/or input information and/or sensor information of a vehicle system or a control panel, and transmit the analyzed control signal to the EXV. The control signal includes at least an initialization state switching signal. The air conditioner controller can switch a state of the EXV directly to an initialization completed state in response to the initialization state switching signal, without performing an mechanical operation for initialization by the EXV, thereby reducing mechanical wear. The electric control unit 62 is configured to receive and analyze control information and/or sensor information transmitted by the air conditioner controller, obtain a control signal by calculating based on preset control programs for the EXV stored by the electric control unit and/or feedback information stored by the electric control unit. The EXV operates based on the control signal received by the electric control unit 62, converts the control signal into an electric quantity which can be implemented by the EXV, and controls the EXV to operate based on the electric quantity.

The air conditioner controller or the electric control unit is provided with an initialization state switching subunit which can identify or extract at least initialization state information of any EXV and/or provide an initialization state switching signal to any EXV. Based on the identified initialization state information and position information of the EXV stored by the air conditioner controller 61, the initialization subunit can provide an initialization state switching signal to any EXV to switch an initialization state. The initialization state information includes at least an initialization completed state and may further include an initialization non-completed state. The air conditioner controller 61 includes a storing unit. The storing unit can store position information of the EXV and can further store the initialization state information for being identified by the initialization subunit.

The air conditioner controller 61 includes a central processing module, and the storing unit may be arranged in the central processing module of the air conditioner controller in an integration manner. Alternatively, in other embodiment, the electric control unit 62 includes a storing unit. The storing unit can store position information and initialization state information of the EXV, such that the electric control unit reads the stored information at a power up phase. The electric control unit 62 provides the storing unit by arranging the central processing module 621, and the storing unit may be arranged in the central processing module of the electric control unit in an integration manner. It should be noted that, the position of the EXV may be indicated by a position where a valve needle is located, and is generally indicated as a step number. For example, a position of 0 step indicates that the valve needle is at the bottom, and in this case a flow is 0; a position of 480 steps indicates that the valve needle is at the top, and in this case the flow is greatest. States of the EXV includes at least three states, i.e., non-initialization, initializing and initialization completion. A state of the EXV is fed back to the air conditioner controller or the electric control unit of the EXV in a real-time manner.

The storing unit is a non-volatile storing element, and can store data when the EXV is powered down, such that the EXV uses the data in a case of being powered up. At each power up phase, the EXV may obtain the initialization state switching signal based on the position information and the initialization state information provided by the storing unit of the air conditioner controller or the storing unit of the electric control unit. The electric control unit controls the EXV to complete switching of an initialization state based on the initialization state switching signal. The EXV can acquire initial position information and adjust its state to an initialization completed state. An original position of the EXV is used as an initial position in subsequent adjusting of an opening, it is avoided that the EXV cannot identify the initial position or an excessive deviation is generated in a case of identifying the initial position, such that a risk of being out of step is reduced, an adjustment accuracy of the EXV is improved; the mechanical structure of the EXV does not perform an initialization operation, i.e., initializing is omitted at a power up phase of the EXV, for example a process that it is changed from full-close to a certain opening or it is changed from full-close to full-open and then to a certain opening does not occur when the EXV performs initialization; power up starting time of the EXV is shortened relatively, and power consumption and initialization noise of the EXV can also be reduced.

When the air conditioner controller starts a program for controlling the EXV to be powered down, the storing unit of the air conditioner controller or the electric control unit can store at least an initialization completed state and position information of the EXV. When the air conditioner controller starts a program for controlling the EXV to be powered up, the air conditioner controller or the electric control unit obtains, by a built-in initialization state switching subunit, an initialization state switching signal based on the initialization completed state and the position information of the electronic expansion valve stored by the storing unit, controls the EXV to switch its state to the initialization completed state, and sets the stored position information as a current initial position, thereby completing switching of the initialization state.

In an embodiment of a control system shown in FIG. 3a and FIG. 3b, the control system is an LIN control system and is configured to transmit a signal in a Local Internet Network (LIN) control mode. The LIN control system includes a master node and multiple slave nodes. In the embodiment, the air conditioner controller 61 (such as an HVAC controller) functions as an LIN master node or an LIN bus, and the EXV functions as one of LIN slave nodes. The initialization process of the EXV at a power up phase is omitted, such that power consumption of a node where the EXV is located can be reduced relatively, power consumption of a whole LIN network can be reduced relatively, an environmental temperature of a vehicle can be reduced indirectly, for example, a high temperature environment in an engine compartment; and reliability of performances of the devices can be improved.

The electric control unit 62 includes the above central processing module 621, a bus signal receiving/transmitting module (an LIN transceiving module 622), a stepping drive control module 623 and a drive module 624. The electric control unit is configured to control a mechanical portion of the EXV, such as a rotor, a transmission portion and a valve needle of a stepping motor (not shown), to operate. Specifically, the rotor may be controlled to rotate by the electric control unit, and the rotation of the rotor enables the valve needle to move up and down, thereby controlling an opening by adjusting a position of the valve needle. At a power up starting phase of the EXV, the EXV adjusts the position of the EXV and adjusts the state of the EXV to an initialization completed state by acquiring the information stored by the storing unit, such that a risk of being out of step is reduced, an adjustment accuracy of the EXV is improved, and initial calibration at the power up phase may be omitted, thereby further reducing mechanical wear of the EXV caused by multiple times of initialization for a long time period relatively and improving a service life of a product.

The LIN transceiving module 622 is configured to transmit a signal detected on the LIN bus to the central processing module.

The central processing module 621 is configured to analyze the signal to obtain an analyzing result, and transmit a feedback signal corresponding to the analyzing result to the LIN bus by the LIN signal transmitting module 13.

The central processing module 621 is configured to receive and analyze control information from a master control panel of the air conditioner system, transmit the analyzed control signal for the EXV to the drive control module, record or store current position information of the EXV, and transmit a feedback signal corresponding to the analyzing result to the LIN bus via the bus transceiving module.

The drive control module 623 is configured to receive a control signal for controlling the EXV transmitted by the central processing module of the air conditioner controller or the electric control unit and transmit the control signal to the drive module.

The drive module 624 is configured to provide an electric signal meeting a requirement of the control signal to an electronic coil, where the electric signal may control the valve needle to operate.

In a case that the electric control unit stores the position information and the initialization state information of the EXV by providing a storing unit, the EXV reads the initialization completed state in the stored initialization state information in a case of the EXV is powered up, switches a state of the EXV to the initialization completed state; the electric control unit can read the stored position information and sets the stored position information as a current initial position of the EXV.

Alternatively, in a case that the air conditioner controller stores the position information and the initialization state information of the EXV by providing a storing unit, at a power down phase of the EXV, the position information and the initialization state information are transmitted from the EXV to the air conditioner controller for storing in a form of an LIN signal. In a case of being powered up, the air conditioner controller transmits the initialization state switching signal to the electric control unit of the EXV in an LIN control mode; the initialization state switching signal includes an initialization state switching signal and the stored position information. The electric control unit receives the initialization state switching signal, switches the state of the EXV to the initialization completed state; the electric control unit receives the stored position information and sets the stored position information as a current initial position of the EXV, thereby completing switching of the initialization state by the EXV.

Figure 5:
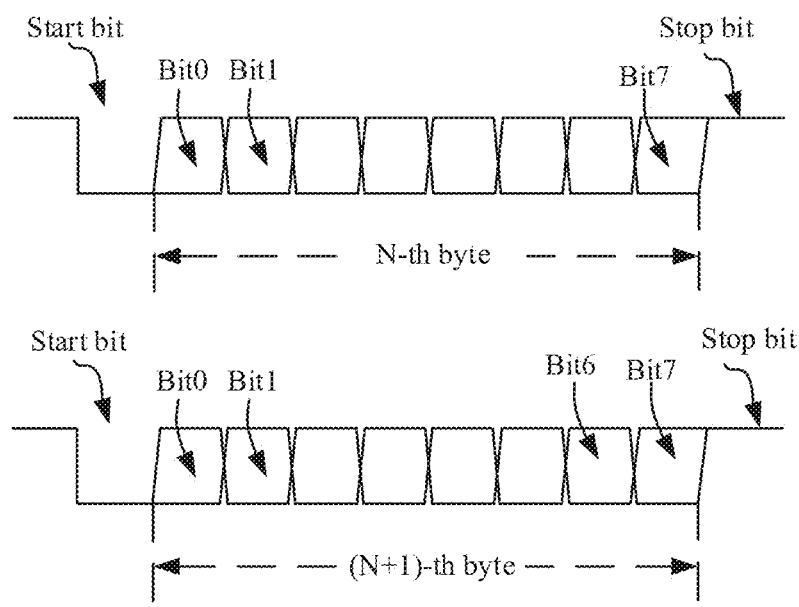
FIG. 5 is a schematic diagram of data segments of a part of LIN signals for switching an initialization state by the electronic expansion valve shown in FIG. 3a and FIG. 3b.

The initialization state switching signal provided to the EXV by the air conditioner controller is an LIN signal. As shown in FIG. 5, the LIN signal includes at least two LIN data bytes, and each of the data bytes includes eight data bits. The position information is indicated by an LIN position signal as follows. All eight bits of an N-th byte and two low bits (bit 0 and bit 1) of an (N+1)-th byte are used to indicate a current position of the EXV. The initialization state information is indicated by two high bits (bit 6 and bit 7) of the (N+1)-th byte, where N is equal to or greater than 1. By using the two segments included in the initialization state switching signal, the LIN master node can transmit state switching and the stored position information to the electric portion of the EXV. Other LIN signal may be defined by referring to a definition of the above two signals in response data of an LIN frame.

In the air conditioner control system shown in FIG. 4 according to another embodiment, the air conditioner controller 63 may be arranged in the electric control unit of the EXV in an integration manner.

The air conditioner controller 63 is configured to receive input information and/or sensor information of a master control panel of the air conditioner system, obtain a control signal by calculating based on preset control programs for the EXV stored by the air conditioner controller and/or feedback information stored by the air conditioner controller, and transmit the control signal to the electric control unit 64, where the feedback information includes at least initialization state information and position information stored by the storing unit of the air conditioner controller.

The electric control unit 64 is configured to convert the control signal into an electric quantity which can be implemented by the EXV and control the EXV by the electric quantity.

The air conditioner controller is provided with a central processing module 630, and the electric control unit 64 of the EXV is provided with a drive control module 641 and a drive module 642. The central processing module of the air conditioner controller is configured to receive input information and/or sensor information, generates a control signal for the EXV by calculating, transmits the control signal to the drive control module, and record or store current position information of the EXV. At a power down phase of the EXV, the position information and the initialization state information are stored in a central processing module of the air conditioner controller 63 or a provided storing unit in a form of variables. The air conditioner controller or the electric control unit is provided with an initialization state switching subunit which can identify or extract at least the stored initialization state information of any EXV and/or provide an initialization state switching signal to any EXV. The initialization subunit can provide, based on the identified initialization state information and the stored position information of the EXV, the initialization state switching signal to any EXV, to switch an initialization state.

In the embodiment, the storing unit and the initialization state switching subunit of the air conditioner controller are arranged in the central processing module 630 of the air conditioner controller in an integration manner. At a power up phase of the EXV, the initialization state switching subunit can read an initialization completed state in the initial state information stored by the storing unit, the initialization state switching subunit can read the stored position information, and sets the stored position information as a current initial position of the EXV to provide to the electric control unit for switching a state to an initialization state, and setting the stored position information as a current initial position of the EXV.

Reference is made to FIG. 6 to FIG. 11 which show a control method for the three types of air conditioner systems in FIG. 3a, FIG. 3b and FIG. 4. The control method includes a method for controlling the EXV.

When the air conditioner controller starts programs for controlling the EXV to be powered down, a built-in storing unit of the air conditioner controller or the electric control unit stores an initialization completed state and position information of the EXV and then controls the EXV to be powered down, such that the EXV completes switching of the initial state before adjusting an opening at a power up phase, thereby providing an accurate initial opening as a basis in adjusting the opening.

When the air conditioner controller starts programs for controlling the EXV to be powered up, based on the initialization completed state and the position information of the EXV stored by the storing unit, the EXV switches its state to an initialization completed state and sets the position information as a current initial position, thereby completing switching of the initial state.

Figure 6:
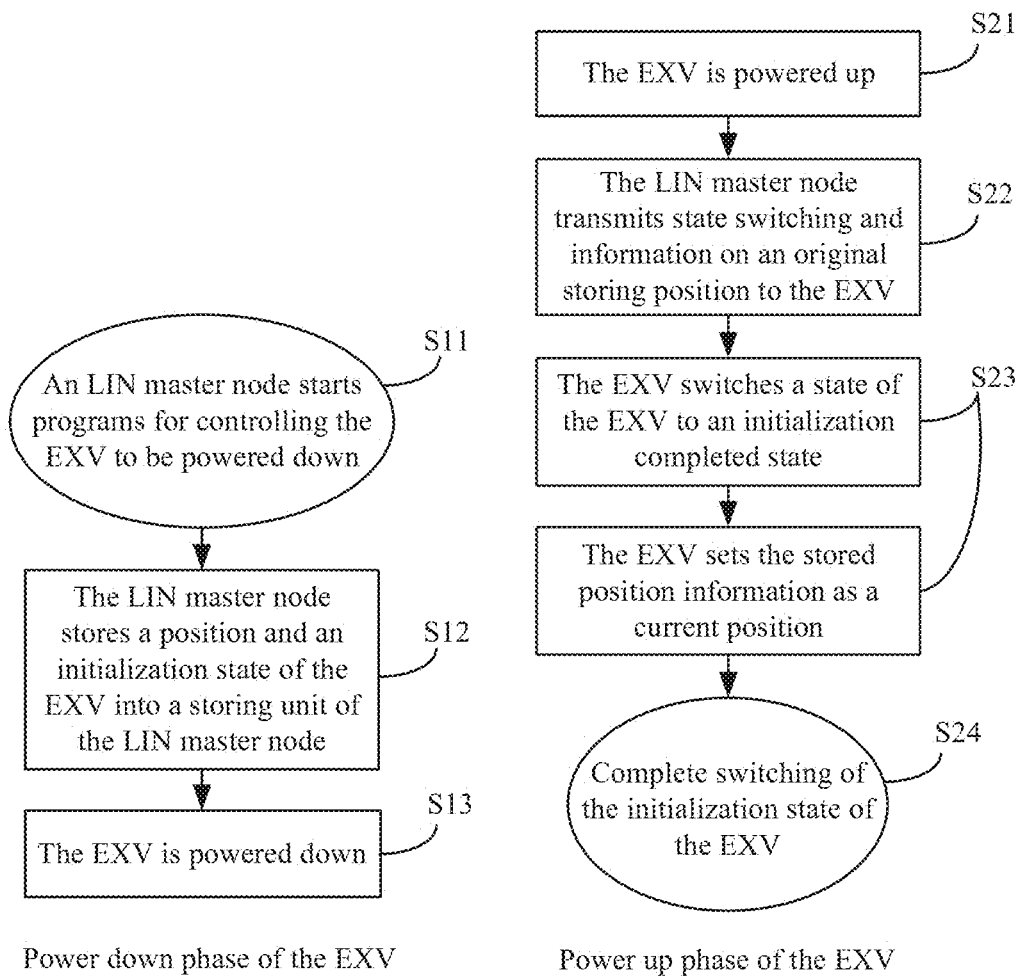
FIG. 6 is a schematic diagram of a method for controlling switching of an initialization state in an LIN control mode by the electronic expansion valve shown in FIG. 3a and FIG. 3b.

As shown in FIG. 6, the air conditioner controller communicates with the EXV in a local internet network control mode. At a power down phase of the EXV, the method includes step S11 to step S13 in the following.

In step S11, the air conditioner controller starts programs for controlling the EXV to be powered down.

In step S12, the position information and the initialization state information are fed back from the EXV to a storing unit of the air conditioner controller for storing in a form of an LIN signal.

In step S13, the EXV is controlled to be powered down, and the method ends.

At a power up phase of the EXV, the method includes steps S21 to S24 in the following.

In step S21, the air conditioner controller controls the EXV to be powered up.

In step S22, the initialization state switching subunit transmits an initialization state switching signal and the stored position information to the EXV in an LIN control mode.

In step S23, subsequently, the electric control unit of the EXV switches a state based on the received initialization state switching signal and switches a state of the EXV to an initialization completed state, where the initialization state switching signal is provided by the initialization state switching subunit; and the electric control unit of the EXV receives the stored position information and sets the stored position information as a current initial position of the EXV.

In step S24, the EXV completes switching of the initialization state.

Figure 7:
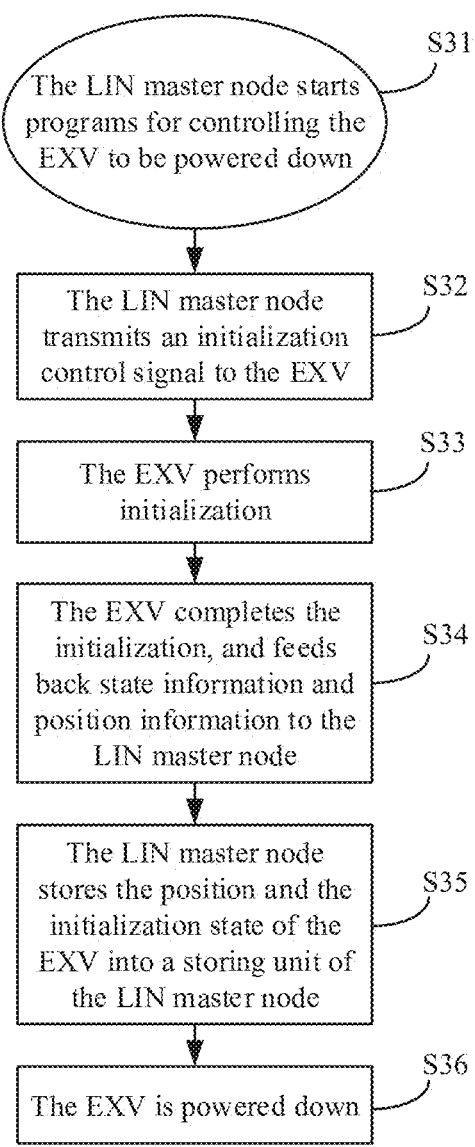
FIG. 7 is a schematic diagram of a second method for controlling switching of the initialization state by the electronic expansion valve shown in FIG. 3a and FIG. 3b.

Reference is made to FIG. 7, which shows the method for controlling the EXV according to another embodiment, where the EXV performs at least one initialization operation before being powered down. The method for a power down phase of the EXV includes steps S31 to S36.

In step S31, the air conditioner controller starts programs for controlling the EXV to to be powered down.

In step S32, the air conditioner controller transmits an initialization control signal to the EXV.

In step S33, the EXV is controlled to perform initialization, thereby further reducing a risk of the EXV being out of step.

In step S34, after the initialization is completed, the EXV feeds back state information and position information to the air conditioner controller (an LIN master node).

In step S35, a storing unit of the air conditioner controller stores the state information and the position information fed back by the EXV.

In step S36, the EXV is controlled to be powered down, and the method ends.

For a power up phase of the EXV, one may refer to the description of the power up phase shown in FIG. 6.

Figure 8:
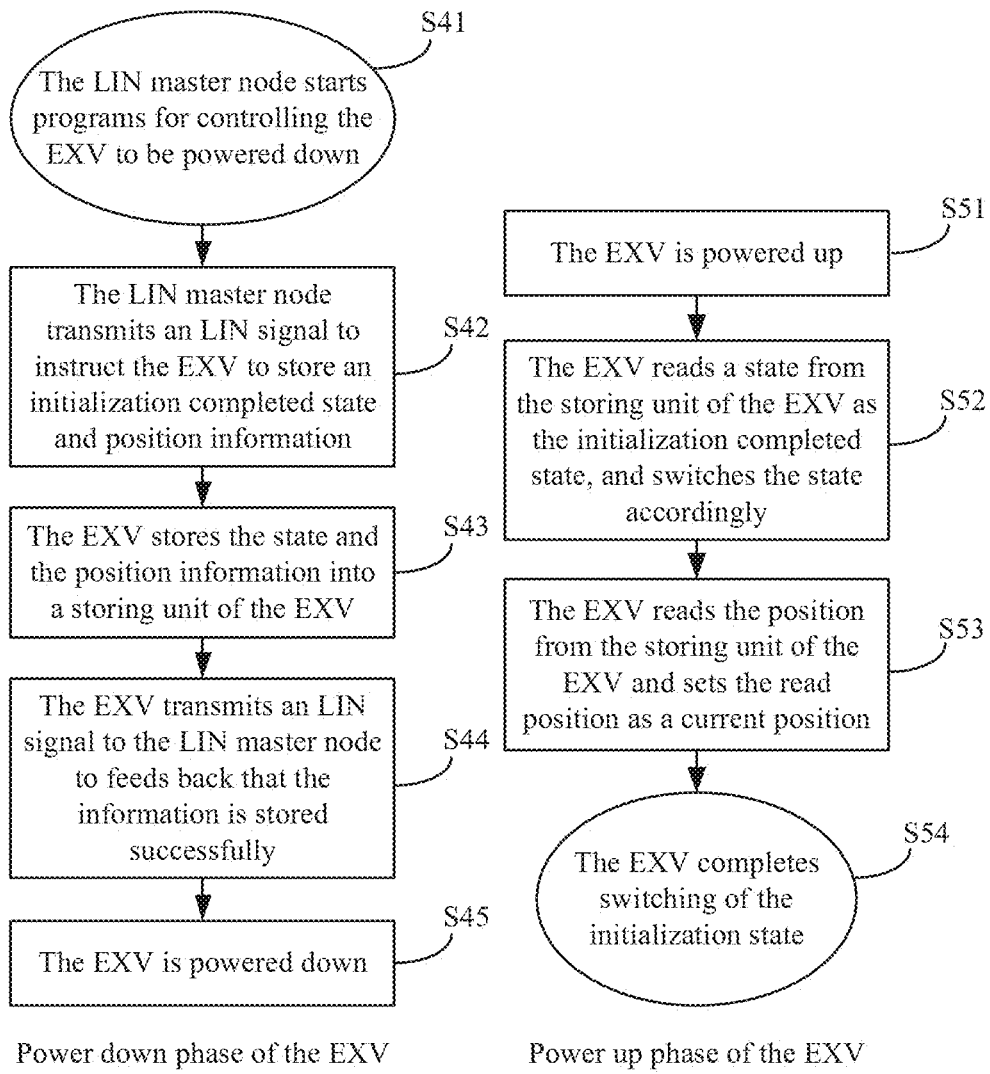
FIG. 8 is a schematic diagram of a third method for controlling switching of the initialization state by the electronic expansion valve shown in FIG. 3a and FIG. 3b.

Reference is made to FIG. 8, which schematically shows a third embodiment of the method for the air conditioner system in FIG. 3a and FIG. 3b, where the position information and the initialization state information of the EXV are stored in a storing unit of the electric control unit of the EXV before the EXV is powered down.

At a power down phase of the EXV, the method includes steps S41 to S44 in the following.

In step S41, the air conditioner controller starts programs for controlling the EXV to be powered down.

In step S42, the air conditioner controller controls the storing unit of the EXV to store the position information and the initialization state information of the EXV by transmitting a storing instruction in a local internet network control mode.

In step S43, after storing the information, the EXV transmits a storing completion feedback signal to the air conditioner controller.

In step S44, the EXV is controlled to be powered down, and the method ends.

At a power up phase of the EXV, the method includes steps S51 to S54.

In step S51, the air conditioner controller controls the EXV to be powered up.

In step S52, an initialization state switching subunit of an electric control unit of the EXV reads an initialization completed state in the initialization state information from a storing unit of the electric control unit, such that the EXV is in the initialization completed state.

In step S53, the electric control unit of the EXV reads a position and sets the read position as a current initial position of the EXV.

In step S54, the EXV completes switching of the initialization state.

Figure 9:
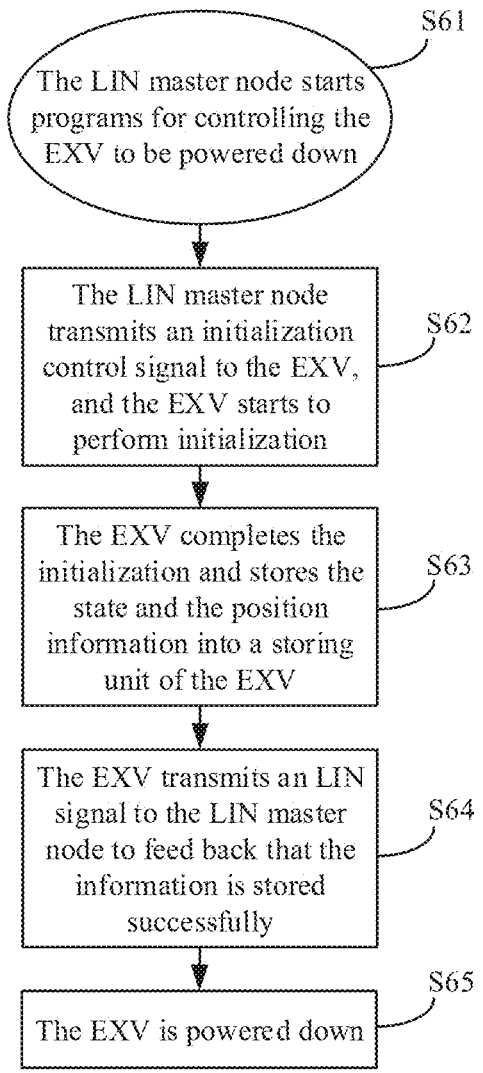
FIG. 9 is a schematic diagram of a fourth method for controlling switching of the initialization state by the electronic expansion valve shown in FIG. 3a and FIG. 3b.

Reference is made to FIG. 9 which shows a method for controlling the EXV and schematically shows a fourth embodiment of the method for the air conditioner system in FIG. 3a and FIG. 3b, where the EXV performs at least one initialization operation before being powered down, compared with the third embodiment of the method above. The method includes steps S61 to S66 in the following.

In step S61, the air conditioner controller starts programs for controlling the EXV to be powered down.

In step S62, the air conditioner controller transmits an initialization control signal to the EXV.

In step S63, the EXV is controlled to perform initialization.

In step S64, after the initialization is completed, a storing unit of the electric control unit is controlled to store state information and position information fed back by the EXV.

In step S65, the EXV transmits a feedback signal indicating that the state information and the position information are successfully stored to the air conditioner controller (an LIN master mode).

In step S66, the EXV is controlled to be powered down, and the method ends.

For a power up phase of the EXV, one may refer to the description of steps shown in FIG. 8.

Figure 10:
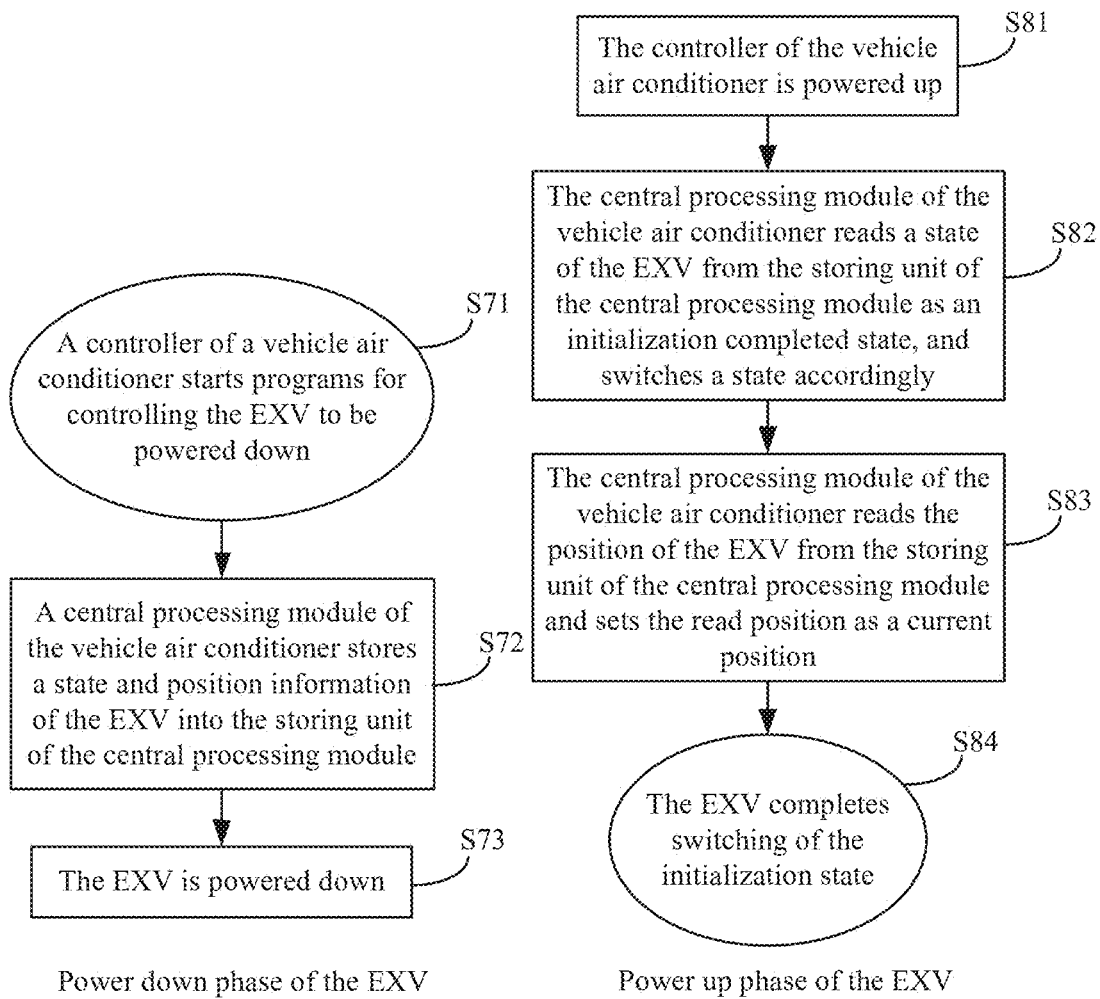
FIG. 10 is a schematic diagram of a first method for controlling switching of an initialization state by the electronic expansion valve shown in FIG. 4.

Reference is made to FIG. 10 which shows a method for controlling the EXV and schematically shows a first embodiment of the method for the air conditioner system in FIG. 4, where the air conditioner controller 63 may be arranged in the electric control unit of the EXV in an integration manner.

At a power down phase of the EXV, the method includes steps S71 to 73 in the following.

In step S71, the air conditioner controller starts programs for controlling the EXV to be powered down.

In step S72, the position information and the initialization state information are stored in a storing unit of the air conditioner controller in a form of variables.

In step S73, the EXV is controlled to be powered down, and the method ends.

At a power up phase of the EXV, the method includes steps S81 to S84 in the following.

In step S81, the air conditioner controller is powered up.

In step S82, the initialization state switching subunit reads an initialization completed state in initialization state information from its storing unit, such that a state of the EXV is the initialization completed state.

In step S83, the initialization state switching subunit reads a position from its storing unit and sets the read position as a current initial position of the EXV.

In step S84, the EXV completes switching of the initial state.

Figure 11:
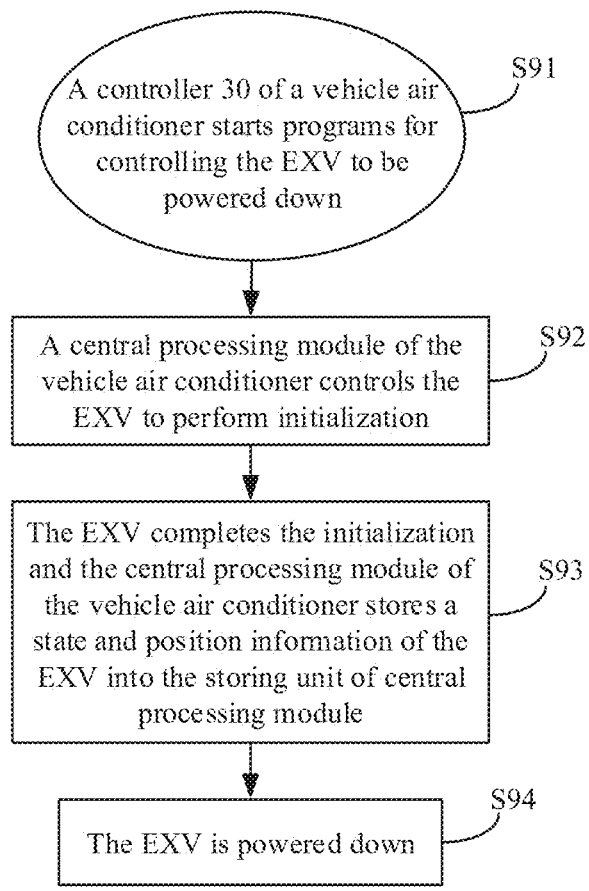
FIG. 11 is a schematic diagram of a second method for controlling switching of the initialization state by the electronic expansion valve shown in FIG. 4.

Reference is made to FIG. 11 which shows a method for controlling the EXV and schematically shows a second embodiment of the method for the air conditioner system in FIG. 4, where the EXV performs at least one initialization operation before being powered down. At a power down phase of the EXV, the method includes steps S91 to S94 in the following.

In step S91, the air conditioner controller starts programs for controlling the EXV to be powered down.

In step 92, the air conditioner controller controls the EXV to perform initialization, thereby further reducing a risk of the EXV being out of step.

In step S93, after the initialization is completed by the EXV, a storing unit of the air conditioner controller is controlled to store state information and position information of the EXV.

In step S94, the EXV is controlled to be powered down, and the method ends.

For a power up phase of the EXV, one may refer to the description of the power up phase shown in FIG. 10.

With the method for controlling the air conditioner system described schematically above, whether initialization is performed or not during a power down process, the position information, the initialization completed state in the initialization state information and switching of the initialization state of the EXV are not influenced. In addition, the storing unit, as a functional unit for storing state information and position information of the EXV, may be arranged in the electric control unit of the EXV, the LIN master node, the central processing module or other modules of a vehicle air conditioner.

The content described above is only the preferred embodiments of the present disclosure and is not intended to limit the present disclosure in any manner. Although the present disclosure is disclosed above by the preferred embodiments, the present disclosure is not limited by the preferred embodiments. Those skilled in the art may make many possible changes and modifications to the technical solutions of the present disclosure or change the technical solutions to equivalent embodiments with equivalent change by using the disclosed methods and technical content without departing from the scope of the technical solutions of the present disclosure. Therefore, any simple changes, equivalent variations and modifications made to the above embodiments based on the technical essence of the present disclosure, without departing from the content of the technical solutions of the present disclosure, fall within the protection scope of the technical solutions of the present disclosure.

The invention claimed is:

1. A heat exchange system, comprising:
   a compressor;
   a first heat exchanger;
   at least one evaporator; and
   at least one electronic expansion valve, wherein
   the first heat exchanger is arranged in a pipeline between an outlet of the compressor and an inlet of the electronic expansion valve, an outlet of the evaporator and an inlet of the compressor are communicated by a pipeline, and a controller of the heat exchange system is configured to control an opening of the electronic expansion valve; and
   wherein the controller of the heat exchange system comprises:
   an air conditioner controller; and
   an electronic expansion valve controller, configured to control a mechanical portion of the electronic expansion valve to operate, wherein
   at least one of the air conditioner controller and the electronic expansion valve controller comprises a memory configured to store position information of the electronic expansion valve and initialization state information of the electronic expansion valve; the position information of the electronic expansion valve comprises a position of a valve needle of the electronic expansion valve, the initialization state information of the electronic expansion valve comprises current state information of the electronic expansion valve, and current state of the electronic expansion valve comprises at least a non-initialization state, an initializing state and an initialization completed state; at least one of the air conditioner controller and the electronic expansion valve controller comprises an initialization state switching subunit, wherein the initialization state switching subunit, when being executed by a processor, is configured to: identify or extract the position information and the initialization state information of the electronic expansion valve, and provide an initialization state switching signal based on the position information and the initialization state information of the electronic expansion valve;
   at least one of the air conditioner controller and the electronic expansion valve controller is configured to: set the stored position of the valve needle of the electronic expansion valve as an initial position of the electronic expansion valve when adjusting an opening of the electronic expansion valve, obtain the initialization state switching signal, and control the electronic expansion valve to complete switching of an initialization state based on the initialization state switching signal;
   the switching of an initialization state comprises: at each power up phase, switching the stored current state of the electronic expansion valve to the initialization completed state directly without performing a mechanical operation for initialization by the electronic expansion valve.

2. The heat exchange system according to claim 1, wherein
   the at least one evaporator comprises a first evaporator and a second evaporator, and the at least one electronic expansion valve comprises a first electronic expansion valve and a second electronic expansion valve;
   the heat exchange system further comprises a second heat exchanger, the second heat exchanger comprises a first heat exchange portion and a second heat exchange portion, and the first heat exchange portion and the second heat exchange portion are configured to exchange heat with each other;
   the first heat exchange portion is arranged in a pipeline between an outlet of the first heat exchanger and at least one of an inlet of the first electronic expansion valve and an inlet of the second electronic expansion valve, and the second heat exchange portion is arranged in a pipeline between the inlet of the compressor and at least one of an outlet of the first evaporator and an outlet of the second evaporator; and
   in the heat exchange system, the first evaporator and the second evaporator are arranged in parallel, the first electronic expansion valve and the first evaporator are arranged in series, and the second electronic expansion valve and the second evaporator are arranged in series.

3. The heat exchange system according to claim 2, wherein
   the heat exchange system is a heating and ventilating air conditioner cooling system, the heat exchange system further comprises a third electronic expansion valve and a cooler; the third electronic expansion valve and the cooler are arranged between the outlet of the first heat exchanger and the inlet of the compressor, and the cooler is arranged in parallel with the first evaporator and the second evaporator.

4. The heat exchange system according to claim 2, wherein the heat exchange system further comprises a third electronic expansion valve and a cooler, the third electronic expansion valve and the cooler are arranged between the outlet of the first heat exchanger and the inlet of the compressor, and the cooler is arranged in parallel with the first evaporator and the second evaporator;

the third electronic expansion valve and the cooler are arranged in series; a refrigerant flow of a branch where a battery cooler is located is controlled by adjusting an opening of the third electronic expansion valve; the cooler is a cooling element for a heat generation component configured to decrease a temperature of the heat generation component;

the initialization state switching subunit of the controller uses, based on position information of the third electronic expansion valve stored by the memory of the heat exchange system, the position information of the third electronic expansion valve as the initial position information of the electronic expansion valve, and the electronic expansion valve is adjusted to be in the initialization completed state based on the initial position information, then the opening of the third electronic expansion valve is adjusted.

5. An air conditioner control system, comprising:

an air conditioner controller; and an electronic expansion valve controller for controlling an operation of an electronic expansion valve, wherein the air conditioner controller is an air conditioner control center and is configured to receive and analyze at least one of a control signal and input information of a vehicle system or at least one of a control signal and input information of a control panel, and transmit the control signal or the input information to the electronic expansion valve, and the electronic expansion valve operates based on the control signal or the input information; or the electronic expansion valve controller is configured to receive and analyze at least one of control information and sensor information transmitted by the air conditioner controller, obtain a control signal based on at least one of a preset control program for the electronic expansion valve stored by the electronic expansion valve controller and feedback information stored by the electronic expansion valve controller, convert the control signal into an electric quantity which is capable of being implemented by the electronic expansion valve, and control the electronic expansion valve by the electric quantity; and at least one of the air conditioner controller and the electronic expansion valve controller comprises a memory configured to store position information of the electronic expansion valve and initialization state information of the electronic expansion valve; the position information of the electronic expansion valve comprises a position of a valve needle of the electronic expansion valve, the initialization state information of the electronic expansion valve comprises current state information of the electronic expansion valve, and current state of the electronic expansion valve comprises at least a non-initialization state, an initializing state and an initialization completed state; at least one of the air conditioner controller and the electronic expansion valve controller comprises an initialization state switching subunit, wherein the initialization state switching subunit, when being executed by a processor, is configured to: identify or extract the position information and the initialization state information of the electronic expansion valve, and provide an initialization state switching signal based on the position information and the initialization state information of the electronic expansion valve;

at least one of the air conditioner controller and the electronic expansion valve controller is configured to: set the stored position of the valve needle of the electronic expansion valve as an initial position of the electronic expansion valve when adjusting an opening of the electronic expansion valve, obtain the initialization state switching signal, and control the electronic expansion valve to complete switching of an initialization state based on the initialization state switching signal;

the switching of an initialization state comprises: at each power up phase, switching the stored current state of the electronic expansion valve to the initialization completed state directly without performing a mechanical operation for initialization by the electronic expansion valve.

6. The air conditioner control system according to claim 5, wherein the memory is arranged in a processor of the air conditioner controller or the electronic expansion valve controller, the memory is a non-volatile memory;

when the air conditioner controller starts a program for controlling the electronic expansion valve to be powered down, the memory of the air conditioner controller or the electronic expansion valve controller is configured to store the position information and the initialization state information of the electronic expansion valve for being identified by the initialization state switching subunit;

when the air conditioner controller starts a program for controlling the electronic expansion valve to be powered up, the initialization state switching subunit is configured to: identify or extract the position information and the initialization state information of the electronic expansion valve, and provide an initialization state switching signal based on the position information and the initialization state information of the electronic expansion valve.

7. The air conditioner control system according to claim 5, wherein the initialization state switching signal comprises the initialization state information and the position information, the initialization state switching signal is sent to the electronic expansion valve controller in a local internet network control mode.

8. The air conditioner control system according to claim 5, wherein the initialization state switching signal provided to the electronic expansion valve by the air conditioner controller is an LIN signal, the initialization sate switching signal comprises at least two LIN data bytes, each of the two LIN data bytes comprises eight data bits;

the stored position information is indicated by all eight bits of an N-th byte and two low bits (bit 0 and bit 1) of an (N+1)-th byte; the initialization state information is indicated by two high bits (bit 6 and bit 7) of the (N+1)-th byte, wherein N is equal to or greater than 1; and the air conditioner controller is configured to transmit initialization state switching instruction and the stored position information to the electronic expansion valve controller by the initialization state switching signal.

9. The air conditioner control system according to claim 5, wherein the air conditioner controller is configured to receive at least one of input information and sensor information of a master control board of an air conditioner system; the electronic expansion valve controller is configured to receive and analyze at least one of control information and sensor information transmitted by the air conditioner controller, obtain a control signal based on at least one of a preset control program for the electronic expansion valve stored by the electronic expansion valve controller and feedback information stored by the electronic expansion valve controller, convert the control signal into an electric quantity which is capable of being implemented by the electronic expansion valve, and control the electronic expansion valve by the electric quantity; the air conditioner controller stores the position information and the initialization state information of the electronic expansion valve by providing the memory and transmits the stored information to the electronic expansion valve controller; the control signal comprises at least the initialization state switching signal; or the electronic expansion valve controller stores the feedback information by providing the memory, the feedback information comprises at least the initialization state information and the position information stored by the memory of the electronic expansion valve controller, for being read by the electronic expansion valve controller; or the air conditioner controller is configured to receive at least one of input information and sensor information of a master control board of an air conditioner system, obtain a control signal by calculating based on at least one of a preset control program for the electronic expansion valve stored by the air conditioner controller and feedback information stored by the air conditioner controller, and transmit the control signal to the electronic expansion valve controller; the electronic expansion valve controller is configured to convert the control signal into an electric quantity which is capable of being implemented by the electronic expansion valve and control the electronic expansion valve by the electric quantity; and the feedback information stored by the air conditioner controller comprises at least the initialization state information and the position information.

10. The air conditioner control system according to claim 5, wherein the air conditioner controller is provided with a processor; the electronic expansion valve controller is provided with an LIN transceiving module, a processor, a drive control module and a drive module; a bus transceiving module is configured to transmit a signal detected on an LIN bus to the processor; the processor is configured to receive and analyze control information from a master control board of an air conditioner system, transmit an analyzed control signal for the electronic expansion valve to the drive control module, record or store current position information of the electronic expansion valve, and transmit a feedback signal corresponding to an analyzing result to the LIN bus via the bus transceiving module; the memory is arranged in the processor of the electronic expansion valve controller in an integration manner, the control signal comprises an initialization state switching signal, or the memory is arranged in the processor of the air conditioner controller; or the air conditioner controller is provided with processor, the electronic expansion valve controller is provided with a drive control module and a drive module; the processor of the air conditioner controller is configured to receive at least one of input information and sensor information, generate a control signal for the electronic expansion valve by calculating, transmit the control signal to the drive control module, and record or store current position information of the electronic expansion valve; the memory of the air conditioner controller is arranged in the processor of the air conditioner controller in an integration manner; and a stepping drive control module is configured to receive the control signal for controlling the electronic expansion valve which is transmitted by the processor of the air conditioner controller or the electric control unit and transmit the control signal to the drive module; and the drive module is configured to provide an electric signal meeting a requirement of the control signal to an electronic coil, and a valve needle is controlled to operate by applying the electric signal on the electronic coil.

11. A method for controlling an air conditioner system, comprising a method for controlling an electronic expansion valve of the air conditioner system, wherein the method for controlling the electronic expansion valve comprises:

when an air conditioner controller starts a program for controlling the electronic expansion valve to be powered down, storing, by a built-in memory of the air conditioner controller or an electronic expansion valve controller, position information of the electronic expansion valve and initialization state information of the electronic expansion valve; wherein the position information of the electronic expansion valve comprises a position of a valve needle of the electronic expansion valve, the initialization state information of the electronic expansion valve comprises current state information of the electronic expansion valve, and current state of the electronic expansion valve comprises at least a non-initialization state, an initializing state and an initialization completed state; and controlling the electronic expansion valve to be powered down after the initialization completed state and the position information of the electronic expansion valve is stored, wherein the electronic expansion valve completes switching of an initialization state at a power up phase based on the stored initialization state information and the position information of the electronic expansion valve;

wherein the switching of an initialization state comprises: at each power up phase, switching the stored current state of the electronic expansion valve to the initialization completed state directly without performing an a mechanical operation for initialization by the electronic expansion valve.

12. The method for controlling an air conditioner system according to claim 11, further comprising:

when the air conditioner controller starts a program for controlling the electronic expansion valve to be powered up, obtaining, by a built-in initialization state switching subunit of the air conditioner controller or the electronic expansion valve controller, an initialization state switching signal by calculating based on the initialization state information and the position information of the electronic expansion valve stored by the memory, controlling the electronic expansion valve to complete the switching of the initialization state based on the initialization state switching signal, and setting the stored position of the valve needle of the electronic expansion valve as an initial position of the electronic expansion valve when adjusting an opening of the electronic expansion valve.

13. The method for controlling an air conditioner system according to claim 11, wherein when the air conditioner controller starts a program for controlling the electronic expansion valve to be powered up, the method comprises:

controlling, by the air conditioner controller, the electronic expansion valve to be powered up;

transmitting, by the air conditioner controller, an initialization state switching signal and the stored position information to the electronic expansion valve in a local internet network control mode; identifying or extracting, by an initialization state switching subunit, at least the initialization state information and the position information of the electronic expansion valve based on the information stored by the memory, and providing an initialization state switching signal to the electronic expansion valve; switching a state, by the electronic expansion valve controller, based on the received initialization state switching signal; and receiving, by the electronic expansion valve controller, the stored position information, and setting the position information stored by the memory as an initial position of the electronic expansion valve, and completing the switching of the initialization state of the electronic expansion valve; or eading, by the initialization state switching subunit, the initialization completed state in the initialization state information from the memory of the electronic expansion valve controller; and reading, by the electronic expansion valve controller, the position information and setting the position information as an initial position of the electronic expansion valve, and completing the switching of the initialization state of the electronic expansion valve; or reading, by the initialization state switching subunit, the initialization completed state in the initialization state information, from the memory of the air conditioner controller, and reading, by the air conditioner controller, a position of the electronic expansion valve, and setting the read position as an initial position of the electronic expansion valve, and completing the switching of the initialization state of the electronic expansion valve.

14. The method for controlling an air conditioner system according to claim 11, wherein when the air conditioner controller starts a program for controlling the electronic expansion valve to be powered down, the method comprises:

communicating, by the air conditioner controller, with the electronic expansion valve in a local internet network control mode; storing, by the memory of the air conditioner controller, the position information and the initialization state information of the electronic expansion valve; and controlling the electronic expansion valve to be powered down normally; or controlling, by the air conditioner controller, the memory of the electronic expansion valve to store the position information and the initialization state information of the electronic expansion valve by transmitting a storing instruction in a local internet network control mode; and transmitting, by the electronic expansion valve, a storing completion feedback signal to the air conditioner controller after the electronic expansion valve stores the information; and controlling the electronic expansion valve to be powered down normally; or storing, by the memory of the air conditioner controller, the position information and the initialization state information of the electronic expansion valve; and controlling the electronic expansion valve to be powered down normally.

* * * * *

UNITED STATES PATENT AND TRADEMARK OFFICE
CERTIFICATE OF CORRECTION

Page 1 of 1

PATENT NO.        : 10,823,448 B2
APPLICATION NO.   : 15/736703
DATED             : November 3, 2020
INVENTOR(S)       : Xiaojun Jiang et al.

It is certified that error appears in the above-identified patent and that said Letters Patent is hereby corrected as shown below:

In the Claims

At Column 25, Claim 13, Line 30, "eading" should read -- reading --

Signed and Sealed this
Ninth Day of February, 2021

Drew Hirshfeld
*Performing the Functions and Duties of the
Under Secretary of Commerce for Intellectual Property and
Director of the United States Patent and Trademark Office*